(12) United States Patent
Fischer et al.

(10) Patent No.: US 7,840,671 B2
(45) Date of Patent: Nov. 23, 2010

(54) MANAGING THE SIZE AND ACCESSIBILITY OF A NAME SERVICE

(75) Inventors: Jeffrey Fischer, San Francisco, CA (US); John Hsu, Burlingame, CA (US); Alok Kumar Srivastava, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 801 days.

(21) Appl. No.: 10/409,541

(22) Filed: Apr. 7, 2003

(65) Prior Publication Data

US 2004/0002922 A1    Jan. 1, 2004

Related U.S. Application Data

(62) Division of application No. 09/258,037, filed on Feb. 25, 1999, now Pat. No. 6,594,702.

(51) Int. Cl.
*G06F 15/16* (2006.01)

(52) U.S. Cl. .................. 709/225; 709/219; 709/227; 709/229

(58) Field of Classification Search ......... 709/220–229, 709/245; 726/1–4
See application file for complete search history.

(56) References Cited

U.S. PATENT DOCUMENTS

| | | | |
|---|---|---|---|
| 5,167,011 A | | 11/1992 | Priest |
| 5,220,604 A * | | 6/1993 | Gasser et al. .................. 707/9 |
| 5,408,619 A * | | 4/1995 | Oran ........................... 707/10 |
| 5,617,540 A * | | 4/1997 | Civanlar et al. ........ 370/395.54 |
| 5,684,984 A | | 11/1997 | Jones et al. |
| 5,760,770 A | | 6/1998 | Bliss et al. |
| 5,826,010 A * | | 10/1998 | Joseph et al. .................. 707/9 |
| 5,862,331 A * | | 1/1999 | Herriot ........................ 709/219 |
| 5,873,108 A | | 2/1999 | Goyal et al. |
| 5,893,114 A | | 4/1999 | Hashimoto et al. |
| 5,893,908 A | | 4/1999 | Cullen et al. |
| 5,913,210 A * | | 6/1999 | Call .............................. 707/4 |
| 5,974,453 A * | | 10/1999 | Andersen et al. ............ 709/220 |
| 6,185,626 B1 | | 2/2001 | Chivi et al. |
| 6,195,701 B1 | | 2/2001 | Kaiserswerth et al. |
| 6,212,557 B1 * | | 4/2001 | Oran .......................... 709/221 |

(Continued)

OTHER PUBLICATIONS

P. Vixie, S. Thomson, Y. Rekhter, and J. Bound. RFC 2136: Dynamic Updates in the Domain Name System (DNS Update), Apr. 1997.*

(Continued)

*Primary Examiner*—Joseph Thomas
*Assistant Examiner*—Brendan Higa
(74) *Attorney, Agent, or Firm*—Hickman Palermo Truong & Becker LLP

(57) ABSTRACT

Provided herein is a name service that includes published data that is associated with one or more duration entities and one or more modification entities, enabling the name service to more efficiently manage access to published data. To publish data, a publishing client transmits a publication request to a name service. The publication request may specify a modification entity. The name service creates at least one name entry that associates the published data with the modification entity. There are several types of requests to modify data that a name service will honor only when they originate from a modification entity.

17 Claims, 7 Drawing Sheets

U.S. PATENT DOCUMENTS

| | | | |
|---|---|---|---|
| 6,223,217 B1 * | 4/2001 | Pettus | 709/219 |
| 6,272,523 B1 * | 8/2001 | Factor | 709/201 |
| 6,411,966 B1 * | 6/2002 | Kwan et al. | 707/201 |
| 6,421,701 B1 * | 7/2002 | Elnozahy | 718/100 |
| 6,895,431 B1 * | 5/2005 | Bero | 709/220 |
| 7,117,227 B2 * | 10/2006 | Call | 707/104.1 |

OTHER PUBLICATIONS

D. Eastlake, Secure domain name system dynamic update, RFC 2137 (Apr. 1997).*

P. Vixie, S. Thomson, Y. Rekhter, and J. Bound, RFC 2136: Dynamic Updates tit the Domain Nanre System (DNS Update), Apr. 1997.*

Enfish Technology Inc., Products, Interactive Demo, 1998-1999, http://www.enfish.com/products/products/product.htm.

Symantec ACT!, Key Features: ACT! 4.0, 1998, http://www.symantec.com/act/kf_act40.html.

Personal Information Managers: Microsoft Outlook 98 (1/3), http://www.zdnet.co.uk/pcdir/content/nov1998/pims_sw/microsoft.html.

Janna Contact Enterprise Suite, May 5, 1999, http://www.janna.com/jsi/products/default.html.

* cited by examiner

FIG. 3

| NAME ENTRY 310 | KEYS FIELD 315 | PUBLISHED DATA 320 | MODIFICATION ENTITIES FIELD 330 | DURATION ENTITIES FIELD 340 |
|---|---|---|---|---|
| | "DB210-TRANS230" | "COORD = DB210, TRANS 230; PART = DB260, TRANS 280" | TRANSACTION 230 | TRANSACT 230, PROCESS 220, DATABASE SERVER 210 |
| | o | o | o | o |
| | o | o | o | o |
| | o | o | o | o |

NAME ENTRIES 300

MANAGING THE SIZE AND ACCESSIBILITY OF A NAME SERVICE

RELATED APPLICATION

The application is a divisional of and claims priority to U.S. application Ser. No. 09/258,037, entitled "Managing The Size and Accessibility of a Name Service", filed on Feb. 25, 1999 now U.S. Pat. No. 6,594,702 by Jeffrey Fischer, et al., the entire contents of which are incorporated by reference.

FIELD OF THE INVENTION

The present invention relates to name services, and in particular, to managing access to and the size of a name service.

BACKGROUND OF THE INVENTION

In a distributed computer system, a multitude of applications cooperate with each other to provide a set of services to clients. To cooperate with each other, applications may need information about each other. Such information may include configuration data, such as port configuration data, and system load data. For example, a business application provides confidential pricing information to users. Before a user is permitted to receive the information, the user logs on to the business application, supplying to the application a password and a user name. To authenticate the user, the business application transmits to an authentication server an authentication request that includes the password and username. The authentication server uses the password and user name to determine whether the user is authorized to receive the pricing information. To cause an authentication server to verify whether a user is authorized, the business application needs certain information about other services. In particular, the business application needs information about who provides authentication services, which port to transmit an authentication request to, and whether the authentication service is currently accepting requests.

One technique for providing such information uses a "name service". A name service is a computer component (e.g. a set of processes) dedicated, at least in part, to registering information received from clients and providing information to clients that request the information. Clients who register information with a name service or who request registered information are referred to as name service clients. A name service allows a name service client to make information available to other name service clients. To make information available to name service clients, a name service client transmits a publication request to a name service. A publication request is a request to make information available to a set of name service clients that request the information. A name service client who issues a publication request is referred to as a publishing client. Typically, the publication request includes a key and data associated with the key. The data associated with the key is referred to as published data because once a name service receives the published data and the associated key, the name service returns the data to any name service client requesting data associated with the key. Making data available in this manner is referred to as publishing the data.

For example, upon initialization, an authentication server transmits the string "PORT=1560" along with a key "AUTH-SERVER-A" to associate with the string. The business application, needing to know to what port to submit an authentication request, queries a name service. Specifically, the business application requests published data associated with the key "AUTH-SERVER-A". In response, the name service returns the published data "PORT=1560".

Typically, when a name service receives a publication request, it creates a name entry which associates the specified key with the specified published data. Over a period of time, a name service receives numerous publication requests, and creates name entries that associate the received published data with their corresponding keys. Overtime, the number of name entries can become unwieldy, many of them being stale, that is, no longer needed or valid ("stale").

One technique for preventing the number of name entries from becoming unwieldy and to eliminate stale entries is referred to as the cooperative technique. Under the cooperative technique, the publishing client responsible for creating entries is responsible for deleting them, by, for example, requesting that the name service delete them.

Unfortunately, the cooperative approach is subject to certain types of errors. First, a computer malfunction may prevent the publishing client that created a name entry from deleting the name entry. Second, the publishing client may not delete an entry it creates simply because it is not configured to do so. Finally, two or more publishing clients may use the same key. Thus, when a first publishing client issues a publication request that includes the key "SAME KEY", the key is associated with the published data specified by the request. When a second publishing client issues a second publication request that includes "SAME KEY", the name service may overwrite the previous entry, and associate "SAME KEY" with the published data specified in the second request.

Because the name service depends on clients to delete a name entry they cause to be created, and those clients may not request the deletion of the entry, the number of name entries may become unwieldy if the name service relies solely upon the cooperation of the publishing entity. Thus, name services that use the cooperative technique also have a mechanism for removing entries when they are so "old". Because it is possible that even old entries may not be stale, the name service applies age criteria that removes entries that are so old that their age leaves little risk that they are not stale. Unfortunately, under such age criteria, many stale entries persist, wastefully occupying memory with data that is not used.

Based on the foregoing, it is desirable to provide a method of deleting information in a name service soon after it is no longer likely to be needed, and to prevent entities from inadvertently overwriting entries created by other entities.

SUMMARY OF THE INVENTION

A method and mechanism for managing a name service is described. The name service described herein includes published data that is associated with one or more duration entities and one or more modification entities. By associating name entries with a modification entity, the name service is able to more efficiently manage access to published data and the amount of memory needed to store it. To publish data, a publishing client transmits a publication request to a name service. The publication request may specify a modification entity. The name service creates at least one name entry that associates the published data with the modification entity.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a block diagram depicting an exemplary name entry database according an embodiment of the present invention;

DETAILED DESCRIPTION OF THE PREFERRED EMBODIMENT

A method and apparatus for managing the accessibility and size of a name service are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
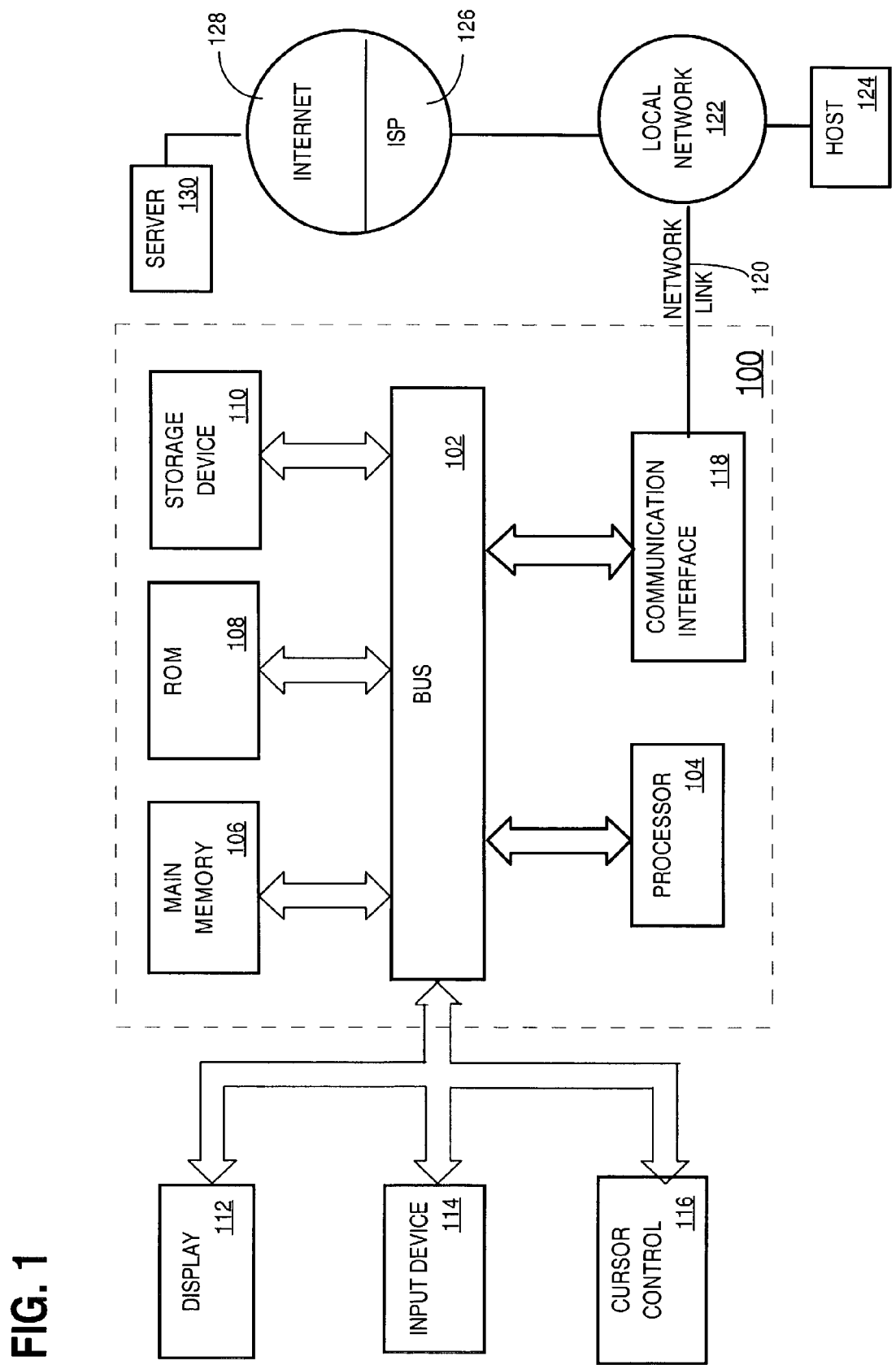
FIG. 1 is a computer system upon which an embodiment of the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for managing the size and accessibility of a name service. According to one embodiment of the invention, management of the size and accessibility of a name service is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for management of the size and accessibility of a name service as described herein.

The received code may be executed by processor 104 as it is received, and/or stored in storage device 110, or other non-volatile storage for later execution. In this manner, computer system 100 may obtain application code in the form of a carrier wave.

Functional Overview

The name service described herein includes published data that is associated with one or more duration entities and one or more modification entities. A modification entity is an entity permitted by a name service to alter published data. A duration entity is an entity whose duration is used to dictate the duration of published data. By associating name entries with a duration entity and a modification entity, the name service is able to more efficiently manage access to published data and the amount of memory needed to store it.

To publish data, a publishing client transmits a publication request to a name service. The publication request may specify a modification entity and a duration entity. The name service creates at least one name entry that associates the published data with the modification entity and the duration entity.

There are several requests to modify or depublish published data that a name service will honor only when they originate from a modification entity. These are (1) requests to modify published data, and (2) requests to depublish published data. Depublishing data refers to making published data unavailable to name service clients.

A name service depublishes published data based on the termination of the duration entity that is associated with the published data. For example, a garbage collector detects when the duration of an entity ends. The garbage collector transmits a message to the name service to indicate that the entity has terminated. In response, the name service depublishes the published data for which that entity was the designated duration entity.

The present invention provides various advantages over conventional name services. First, published data is associated with modification entities, and only those modification entities may modify the published data. This feature prevents the published data of a name service client from being inadvertently altered by another name service client. Second, the lifetime of published data may be set by associating the published data with a duration entity. Because published data associated with the duration entity is depublished based on when the duration entity terminates, the published data will not remain in the system when it goes stale. Conversely, data that is "old" but not stale will not be prematurely depublished.

Exemplary Name Service Clients

Figure 2:
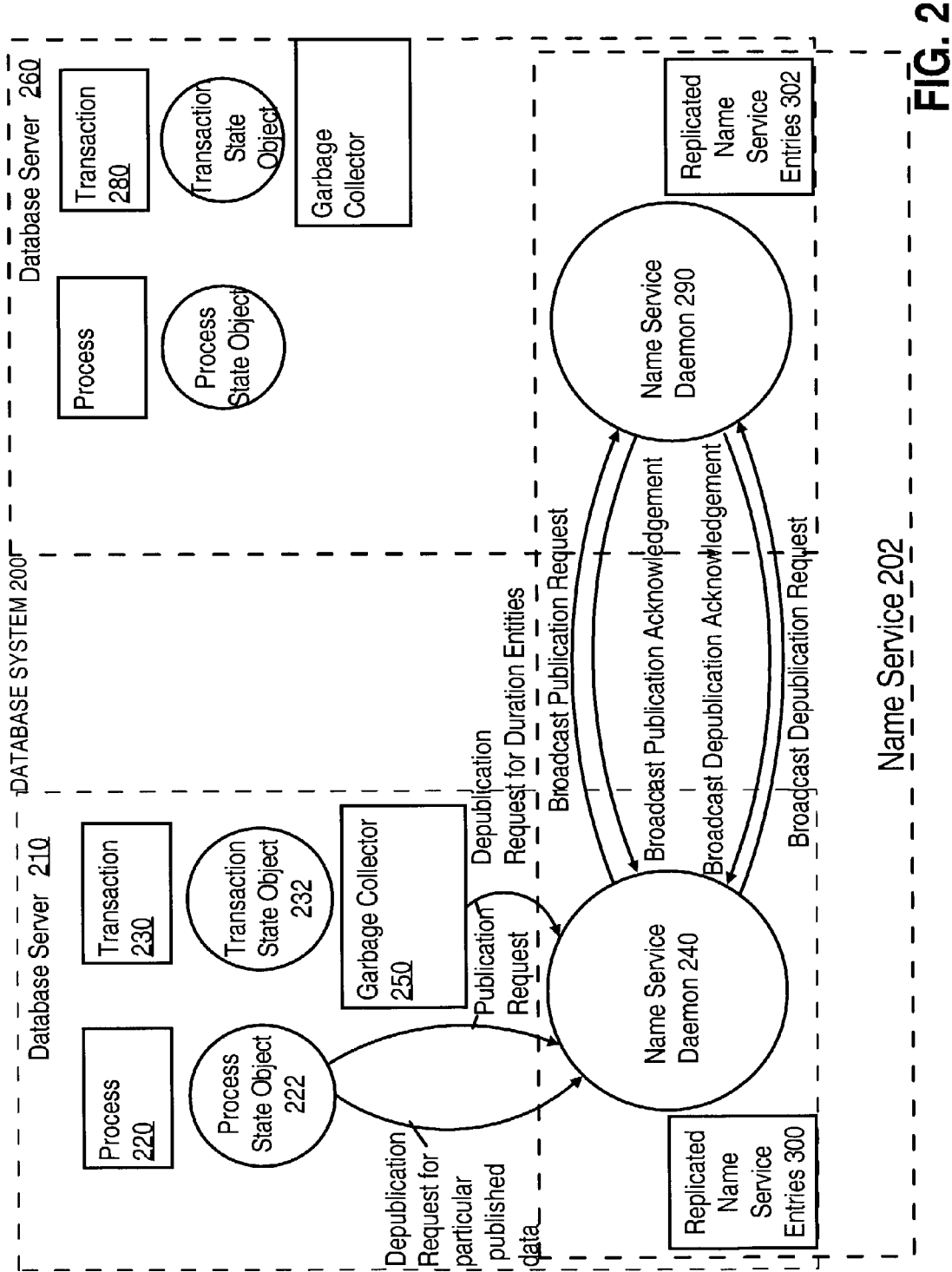
FIG. 2 is a block diagram depicting an exemplary database system upon which an embodiment of the present invention may be implemented.

FIG. 2 shows a computer system in which processes of database servers are name service clients according to an embodiment of the present invention. Referring to FIG. 2, database system 200 includes database server 210 and database server 260. A database server is a combination of a set of processes and memory allocated to those processes. These processes include processes that execute transactions and processes that support those processes executing transactions. A transaction is logical unit of work that is atomic. Database servers 210 and 260 may reside together on a shared everything system or together on a node in a shared disk system or shared nothing system, or on different nodes in a shared disk system or shared nothing system.

A database server communicates with a connected user process and performs tasks on behalf of the user. A user may be an individual, or another database server. These tasks typically include the execution of transactions.

Database server 210 includes a process 220 executing a transaction 230. Both process 220 and transaction 230 will eventually terminate. Thus each has a finite lifespan or "duration". The beginning and ending of an entity's duration depends on the type of the entity. For example, the duration of a transaction begins when a user submits a task and ends when the transaction commits or aborts, and resources allocated to the transaction are released for other purposes. A duration of the process ends when the process is terminated, that is, when an operating system or database system, for example, deems that no further work that is associated with the process is to be performed. Another example of entities that have a duration are a database session and an instance. When the duration of an entity ends, the entity is referred to as expired.

Process state object 222 and transaction state object 232 are state objects. State objects are data structures that contain data that reflect the state of entities that are associated with the objects. Process state object 222 is associated with process 220, and transaction state object 232 is associated with transaction 230. Consequently, the data in process state object 222 reflects the state of process 220, and the data in transaction state object 232 reflects the state of transaction 230.

State objects have a duration that is typically tied to the duration of their associated entities. When the duration of the associated entity ends, the data in the state object is typically no longer needed. For purposes of efficient use of memory, the memory occupied by the state object associated with expired entities is reclaimed, that is, de-allocated so that it may be allocated for other purposes.

Garbage collector 250 is a mechanism that reclaims memory, including memory occupied by state objects. Periodically, garbage collector 250 scans state objects stored in memory, examining each of them. For each state object it examines, garbage collector 250 determines whether or not the state object has expired. If so, then the garbage collector de-allocates memory allocated to the expired state object.

Exemplary Name Service

Referring again to FIG. 2, name service 202 is a name service that includes one or more processes ("name service daemons") that are under the control, at least in part, of one or more database services. Name service 202 includes name service daemon 240, which resides on database server 210, and name service daemon 290, which resides on database server 260. For purposes of efficiency, a name service daemon services requests (e.g. publication requests) from name service clients that reside on the same database server on which the name service daemon resides. Name service daemon 240 services requests from name service clients within database server 210. Similarly, name service daemon 290 services requests from name service clients within database server 260.

Name entries for name service 202 are replicated on each of database servers 210 and 260 as replicated name entries 300 and replicated name entries 302. Replicated name entries 300 are managed by name service daemon 240, and replicated name entries 302 by name service daemon 290. A set of name entries and a process (e.g. name service process) that manages them are referred to as being local with respect to each other. Thus with respect to name entries 300, name service daemon 240 is a local name service daemon, and with respect to name service daemon 240, name entries 300 are local name entries. The manner in which the name entries are replicated shall be later described in detail.

It is not necessary that a name service include a name service daemon on every database server serviced by a name service. For example, name service 202 may include one name service daemon, such as name service daemon 240, and replicate no name entries. Name service daemon 240 would service name service requests from both database server 210 and database server 260.

FIG. 3 shows replicated name entries 300 stored on database server 210. Replicated name entries 302 is a replication of replicated name entries 300. Fields included in name entry 310 associate published data with one or more keys, and one or more modification entities and duration entities. Each name entry includes a keys field 315, a published data field 320, a modification entities field 330, and a duration entities field 340. The data stored in keys field 315 of each name entry specifies one or more keys. The data stored in modification entities field 330 of each name entry specifies any modification entities associated with that name entry. The data stored in duration entities field 340 specifies any duration entities associated with the name entry.

Name entry 310 includes information about a distributed transaction between database server 210 and database server 260. The distributed transaction is assigned a transaction identifier on each database server. In the illustrated example, the distributed transaction is transaction 230 for database server 210, and transaction 280 for database server 260. Database server 210 is designated as a coordinator for the distributed transaction, and database server 260 is designated a participant.

Published data field 320 of entry 310 contains a string specifying the coordinator for the distributed transaction, the participant, and the transaction identifier assigned to the distributed transaction in each. In the present example, the published data field 320 of entry 310 contains the string "COORD=DB210, TRANS 230; PART=DB260, TRANS 280". The "COORD=DB210" portion of this string indicates that database server 210 is the coordinator of the distributed transaction. The "TRANS 230" portion of the string indicates that transaction 230 is the identity of the local transaction within database server 210 that corresponds to the distributed transaction. The "PART=DB260" portion of the string indicates that database server 260 is a participant in the distributed transaction. The "TRANS 280" portion of the string indicates that transaction 280 is the local transaction within database server 260 that corresponds to the distributed transaction.

The published data in each name entry is associated with one or more keys. The keys are used by name service clients to indicate the entries in which they are interested. In the present example, name entry 310 has the key values "DB210-TRANS-230" or "TRANS-230" stored in its keys field 315. Thus, a name service client may request the published data from name entry 310 using either string "DB210-TRANS-230" or "TRANS-230" as the key.

Modification entities field 330 of name entry 310 stores data that specifies that the modification entity for name entry 310 is transaction 230. Duration entities field 340 of name entry 310 specifies three entities as duration entities for name entry 310. The three entities thus specified are transaction 230, process 220, and database server 210.

Publishing Data

According to an embodiment of the present invention, to publish data, an entity transmits a publication request to a name service, or more particularly, a name service daemon belonging to the name service. The particular name service daemon to which an entity sends a publication request is referred to herein as the publishing name service daemon. The publication request specifies the published data, the keys to associate with the published data, and may optionally specify one or more modification entities and duration entities. After the publishing name service daemon receives the publication request, it creates a name entry, and transmits information to other name service daemons ("replicating name service daemons") so that they may replicate the name entry.

There are two modes that entities can use to publish data: blocking mode and non-blocking mode. In blocking mode a message is transmitted to a publishing client when a name entry for the published data is replicated on all the replicating name service daemons. In non-blocking mode, no such message is transmitted. Blocking mode is useful to processes that need know whether changes to published data have been fully replicated on a set of name service daemons.

The steps for publishing data shall now be described in detail with reference to FIG. 4. During the discussion of FIG. 4, the entities shown in FIG. 3 and FIG. 4 shall be used as examples.

Figure 4:
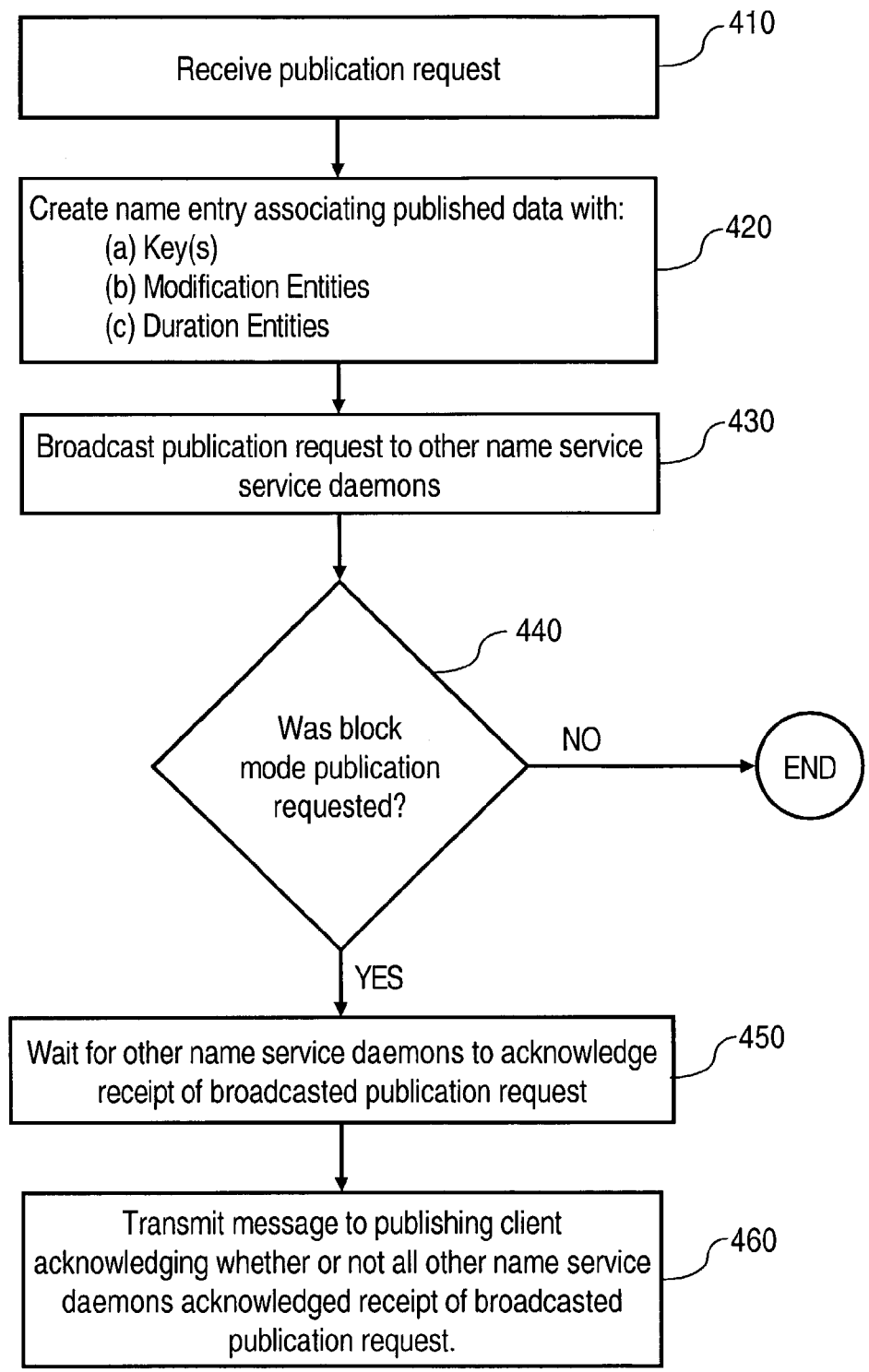
FIG. 4 is a flow chart showing steps for publishing data via a name service according an embodiment of the present invention.

Referring to FIG. 4, at step 410, a publication request is received by a publishing name service daemon. For the purpose of explanation, it shall be assumed that process 220 transmits a publication request to name service daemon 240 for the purpose of communicating to other database processes information about the participants of a distributed transaction that is being coordinated by database server 210. The request specifies "COORD=DB210, TRANS 230; PART=DB260, TRANS 280" as the published data, "DB210-TRANS-230" or "TRANS-230" as the associated keys, "transaction 230" as the modification entity, and transaction 230, process 220, and database server 210 as the duration entities.

At step 420, name service daemon 240 creates a name entry that stores the information specified in the received publication request. In this example, name service daemon 240 creates name entry 310.

At step 430, a broadcast publication request is transmitted by the publishing name service daemon to the replicating name service daemons. A broadcast publication request is a request sent by a publishing name service daemon to replicating name service daemons to cause the replicating name service daemons to replicate a name entry that has been created by the publishing name service daemon. The broadcast publication request specifies the values for the fields of a name entry (e.g. keys field 315, published data field 320, modification entities field 330, and a duration entities field 340) In this example, name service daemon 240 transmits a broadcast publication request to name service daemon 290 to cause name service daemon 290 to create a replica of name entry 310.

At step 440, it is determined whether the publishing entity requested blocking mode publication. If blocking mode publication was not requested, then execution of the steps shown in FIG. 4 ceases. Otherwise, execution proceeds to step 450. In this example, it shall be assumed that the publication request sent by process 220 specified blocking mode publication. Therefore, execution of the steps proceeds to step 460.

At step 450, the publishing name service daemon waits for broadcast publication acknowledgments from the replicating name service daemons. A broadcast publication acknowledgement is a message sent from a replicating name service daemon acknowledging that it has replicated the name entry specified in a broadcast publication request. The publishing name service daemon may wait until an acknowledgement is received from each of the replicating name service daemons, or until a threshold period of time expires. In this example, name service daemon 240 waits until it receives from name service daemon 290 a broadcast publication acknowledgement.

At step 460, a signal is transmitted to the publishing client to inform the publishing client whether or not all replicating name service daemons transmitted broadcast publication acknowledgements. The publishing client determines how to proceed based on the received signal. In the present example, name service daemon 240 receives a broadcast publication acknowledgement from the only replicating name service daemon (name service daemon 290). Therefore, at step 460 name service daemon 240 sends process 220 a signal indicating that all replicating name service daemons have transmitted broadcast publication acknowledgements.

It should be noted that the steps illustrated in FIG. 4 apply when a publication request specifies keys for which name entries do not already exist in a name server. However, it is possible that a publication request may specify keys that are already associated with published data. In this case, the publication request is treated as a modification request, which is described in greater detail later.

Implicitly Specifying Modification and Duration Entities

In the example given above, process 220 explicitly identifies the modification and duration entities for name entry 310. However, a request may also implicitly specify the modification entity or duration entity to associate with published data. For example, if a publication request does not contain any data that explicitly specifies either a modification entity or a duration entity, the name service receiving the request may be configured to interpret the publication request to implicitly specify a particular publication entity. Thus, a publication request transmitted by a name service client on database server 210 that does not specify a modification entity or a duration entity may be interpreted to implicitly designate database server 210 as the duration entity and modification entity to associate with the published data.

Implementing Blocking and Non-Blocking Modes

Various techniques may be used to support blocking and non-blocking modes. For example, a function provided by a name service may be invoked by a publishing client to cause the name service to perform the steps of FIG. 4. When the function is invoked, the client passes parameters to a name service daemon specifying not only the keys, modification entities, and duration entities, but whether blocking mode is requested. If blocking mode is not requested, the function is exited after step 440, and control is returned to the client. Thus, the client can continue executing while the remaining steps of FIG. 4 are being performed.

If blocking mode is requested, then the called function performs step 450, and only returns control to the client when all broadcast publication acknowledgements are received, or the threshold period of time has elapsed. Thus, returning control to the client signals that either all name entries have been replicated, or the publication request failed due to reasons such as the threshold period of time has expired. A parameter returned to the client may be used to signal whether or not the published data has been replicated at all the replication sites.

If all replicating service daemons acknowledge replicating the published data, then the process of publishing data to the publishing name service daemon and the replicating name service daemons is completed when control is returned to the name service client. Thus, from the perspective of the publishing client, the process of publishing data to the publishing name service daemons and the replicating name service daemons is performed as an atomic unit of work.

If on the other hand, not all the replicating name service daemons acknowledge replicating the name entry, then a computer malfunction has probably occurred. When control is returned to the client, the name service client then performs error processing.

Another technique for supporting blocking and non-blocking modes involves providing two functions on the name service: a blocking mode function for performing the publication in blocking mode, and a non-blocking function for not performing the publication in blocking mode. When the block function is invoked, a name service daemon performs the steps in FIG. 4, except step 440. When the non-block function is performed, steps 410 through 430 are performed.

Yet another technique for supporting blocking and non-blocking modes is to provide one function that may be invoked by a client to transmit a publication request, and another function that may be invoked to query the name service about whether the replicating name service daemons have replicated the name entry. The client invokes the query function until (1) the function returns data indicating that the broadcast publication acknowledgements have been received from the replicating sites, or (2) a threshold period of time expires, or the query function has been invoked a threshold number of times. When the query function returns, data is passed to the client signaling whether or not the name entry has been replicated on all replication sites.

Explicit Key Depublication

Figure 5:
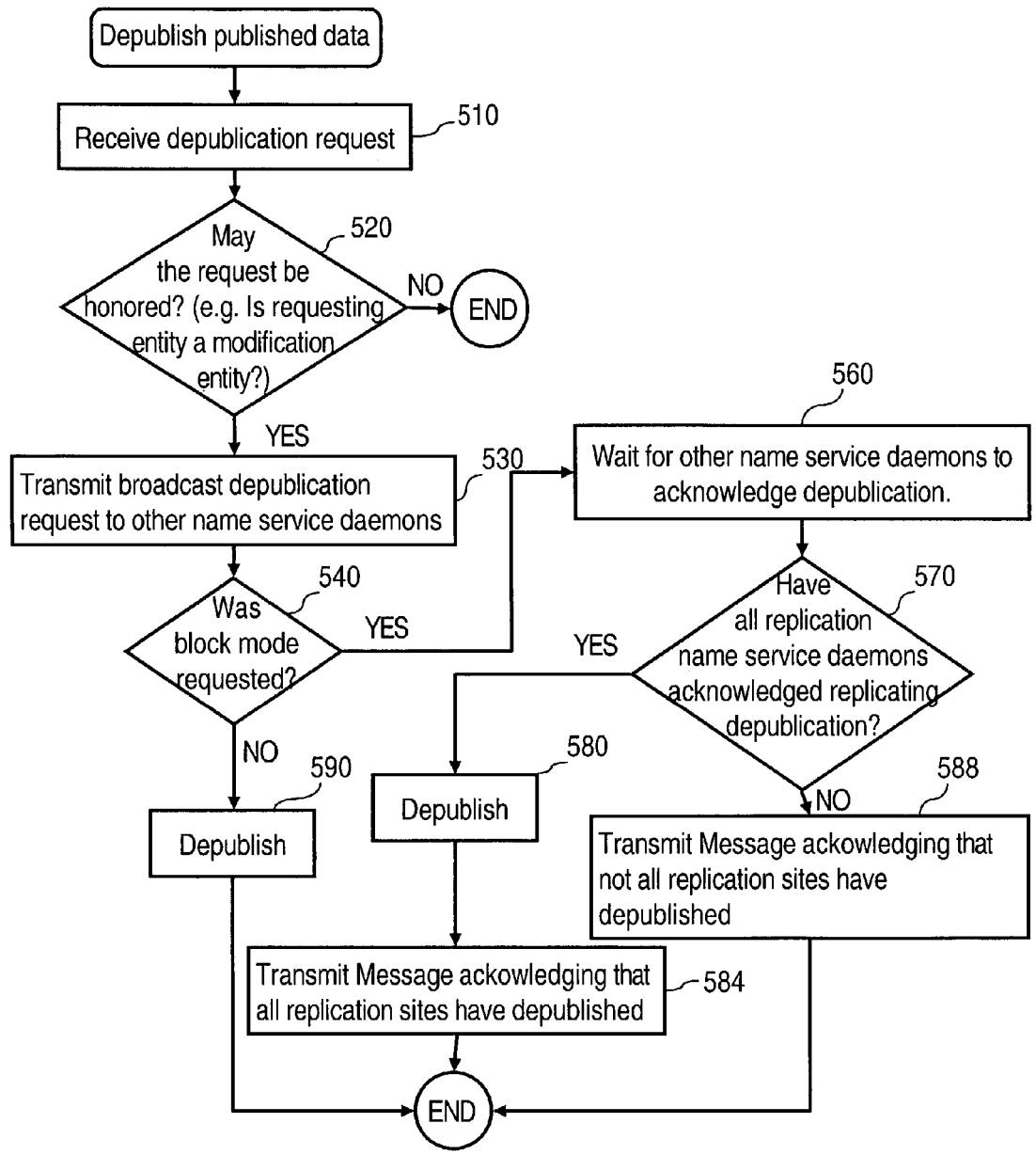
FIG. 5 is a flow chart showing steps for depublishing data according to an embodiment of the present invention.

FIG. 5 shows the steps for explicitly depublishing data associated with one or more keys according to an embodiment of the present invention. To explicitly depublish data, an entity transmits a depublication request to a name service, or more particularly, a name service daemon belonging to the name service. The request specifies one or more keys associated with the publication data that is to be depublished. The entity transmitting the request is referred to as the "depublishing entity", and the particular name service daemon to which it transmits a depublication request is referred to as the "depublishing name service daemon". The depublication request specifies two items: (1) one or more keys associated with the published data to depublish ("depublication key"), and (2) the identification of the entity transmitting the depublication request.

After the depublishing name service daemon receives the depublication request, it transmits a broadcast depublication request to the replicating name service daemons. In response, each replicating name service daemon deletes the replicated entries local to it, and acknowledges the deletion to the depublishing name service daemon. The steps shown in FIG. 5 are illustrated using the items shown in FIG. 2 and FIG. 3 as an example.

Referring to FIG. 5, at step 510, a depublication request is received from a depublishing entity. A depublication request specifies the depublication key and the identity of the depublishing entity. In this example, process 220 is executing transaction 230 and transmits a depublication request on behalf of transaction 230. The depublication request specifies that the depublishing entity is transaction 230, and that the depublication key is "DB210-TRANS230".

At step 520, it is determined whether the depublication request may be honored. This determination may be made by determining whether the depublication entity is a modification entity that is associated with the depublication key. If it is determined that the depublication entity is not a modification entity associated with the depublication key, then execution of the steps ceases. Otherwise, control passes to step 530. If the modification entity is a database server, then any entity residing on the database server is considered to be a modification entity. In this example, name entries 300 are examined to find a name entry having a key column field specifying the depublication key "DB210-TRANS230". The keys field 315 of name entry 310 specifies the key. The modification entities field 330 specifies that transaction 230 is a modification entity for the name entry. Thus, it is determined that the depublishing entity is one of the modification entities associated with the depublication key.

At step 530, a broadcast depublication request is transmitted to the replicating name service daemons. A broadcast depublication request is a request transmitted from the depublishing name service daemon to a replicating name service daemon to depublish a name entry local to the replicating name service daemon. In this example, name service daemon 240 transmits a broadcast depublication request to name service daemon 290.

At step 540, it is determined whether the depublishing entity requested blocking mode depublication. If blocking mode depublication was requested, then execution of the steps flows to step 560. Otherwise, execution proceeds to step 590, where the name entry is depublished from the depublishing name service daemon.

In this example, the depublication request includes data specifying that blocking mode was requested. Therefore, execution of the steps proceeds to step 560.

At step 560, the depublishing name service daemon waits for broadcast depublication acknowledgments from the replicating name service daemons. A broadcast depublication acknowledgement is a message sent from a replicating name service daemon acknowledging that it has depublished the local name entry specified in a broadcast depublication request. The name service daemon may wait until an acknowledgement is received from each of the name service daemons, or until a threshold period of time expires. In this example, name service daemon 240 receives from name service daemon 290 a broadcast depublication acknowledgement.

At step 570, it is determined whether the depublication acknowledgements were received from all the replicating name service daemons. If depublication acknowledgements were received from all replicating name service daemons, control flows to step 580. Otherwise, control flows to step 588, where a message is transmitted indicating that the depublishing name service daemon did not receive depublication acknowledgements from all replicating name service daemons.

In this example, name service daemon 240 received a depublication acknowledgment from name service daemon 290. Therefore, it is determined that depublication acknowledgements were received from all the replicating name service daemons. Control therefore flows to step 580.

At step 580, the published data is depublished. In this example, the name entry 310 is deleted. Alternatively, name entry 310 can be marked to indicate that it has been depublished. After a name entry is marked as depublished, the name service no longer provides the published data associated with the name entry in response to queries that specify the keys associated with the name entry.

At step 584, the depublishing name service daemon transmits a message indicating that the depublishing name service daemon did receive depublication acknowledgements from all replicating name service daemons. Execution of the steps ceases.

Depublishing Published Data when a Duration Entity Expires

Figure 6:
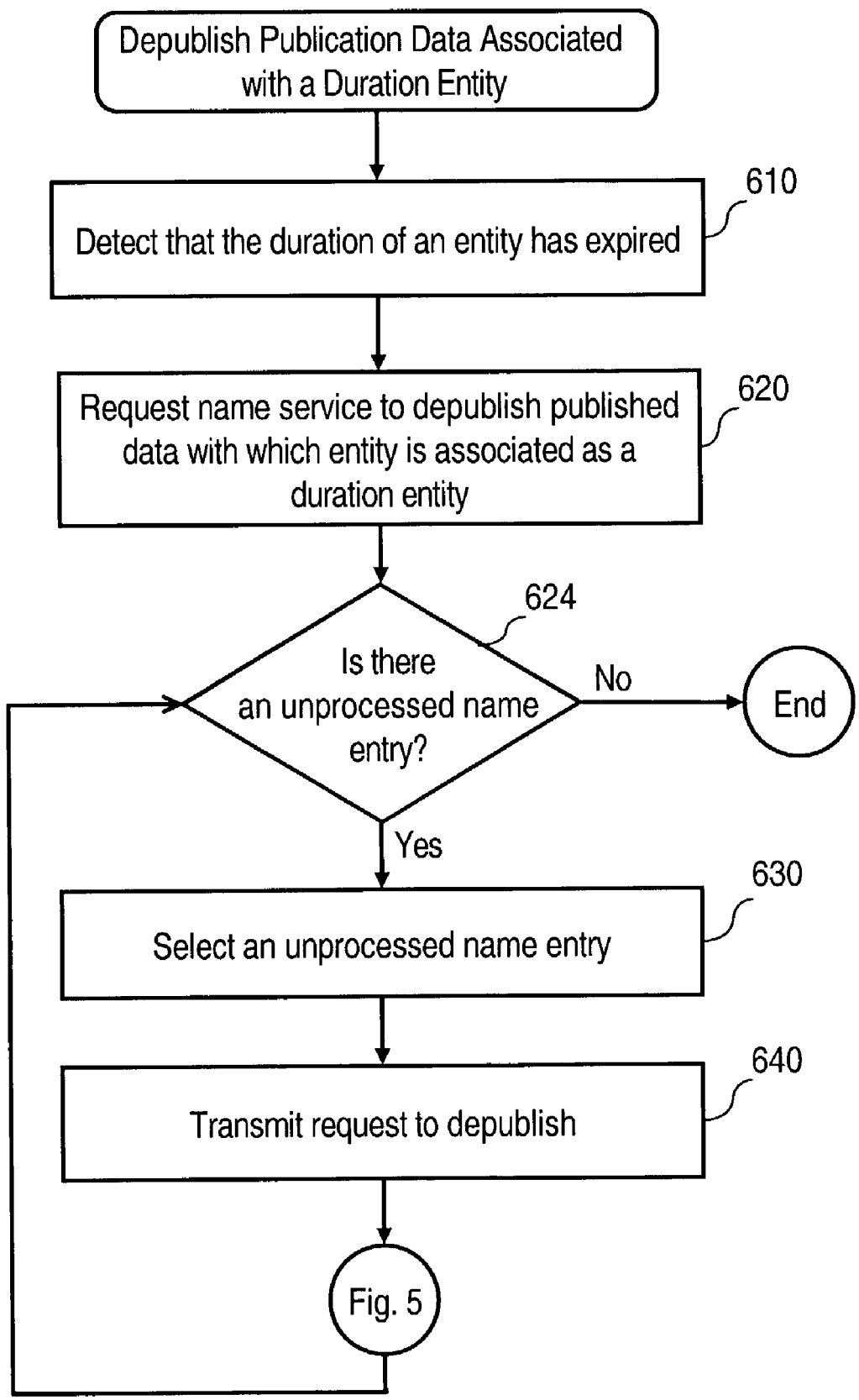
FIG. 6 is a flow chart showing steps for depublishing published data associated with an expired duration entity according an embodiment of the present invention.

When not explicitly depublished, the duration of published data is dictated by the duration entities associated with the published data. When a duration entity expires, the published data associated with the duration entity is depublished. FIG. 6 shows the steps performed to depublish data in response to the expiration of the duration entity associated with the data. According to an embodiment of the present invention, the depublication process involves garbage collector 250, which reclaims state objects after their associated entities have expired. The steps are performed by name service functions that are invoked by garbage collector 250 while garbage collector 250 scans memory for state objects to collect.

Referring to FIG. 6, at step 610, an expired entity is detected. For the purposes of explanation, it shall be assumed that data in transaction state object 232 indicates that transaction 230 has expired. Consequently, step 610 may be performed by garbage collector 250 examining transaction state object 232 and detecting that the transaction 230 has expired.

At step 620, a request is transmitted to the name service for the depublication of name entries associated with the expired entity. In this example, garbage collector 250 transmits a request to name service daemon 240 requesting the depublication of its local name entries for which the transaction 230 is the designated duration entity.

At step of 624, a determination is made of whether there is an unprocessed name entry for which the expired entity is a designated duration entity. An unprocessed name entry for the purposes of FIG. 6 is a name entry which has not been depublished at step 630. If the determination is that there is no unprocessed name entry, then execution of the steps ceases. Otherwise, control flows to step 630.

At step 630, an unprocessed name entry is selected. In this example, name entry 310 is selected.

At step 640, a depublication request is transmitted to a module responsible for executing the steps of FIG. 5. Next, the steps of FIG. 5 are executed. At step 520, if the depublication request is from garbage collector, then the determination is that the request may be honored. In this example, a depublication request that specifies name entry 310 is transmitted. In response to receiving the request, the module responsible for executing the steps of FIG. 5 depublishes name entry 310. Control then returns to step 624.

A garbage collector is but one example of a mechanism that may be used to detect expired entities. There are other mechanisms that may be used. For example, a process may detect that a transaction has expired after the process completes the transaction (e.g. after the transaction has committed or aborted). After detecting the expired entity, the process may itself transmit a message to the name service. Therefore, it is understood that the present invention is not limited to any particular method for detecting expired entities.

Alternate Depublication Techniques when More than One Duration Entity Specified While the steps shown in FIG. 6 illustrate a technique for depublishing when only one of the duration entities associated with published data expires, alternate depublication techniques are possible. One alternate technique is to depublish published data when a request to depublish is received from all duration entities associated with the published data. For example, name service daemon 240 receives requests to depublish published data from each of the duration entities associated with the published data. Specifically, name service daemon 240 receives in the following order requests from transaction 230, process 220, and database server 210. Once the request to depublish is received from database server 210, depublication of the published data is commenced.

Rather than receiving requests from all corresponding duration entities before depublishing published data, published data may be depublished after requests to depublish are received from a threshold number of duration entities that are associated with the published data. For example, after receiving requests from two of the duration entities associated with the published data of name entry 310, the published data is depublished. Thus, when a request to depublish is received from transaction 230 and then process 220, the published data associated with name entry 310 is depublished.

Modifying Published Data

Published data may be modified by a name service client by transmitting a modification request to a name service, or more particularly, a name service daemon belonging to the name service. A modification request specifies a change to existing published data. A modification request may include data that, in addition to specifying one or more keys, specifies a replacement value for the associated published data. Thus, when a name service receives a modification request, it replaces the published data associated with the one or more keys with the replacement value. However, according to one embodiment of the invention, the name service only honors modification requests to modify published data from the designated modification entities of the published data. The name service daemon of the name service that is receiving the modification request is referred to as the modifying name service daemon, and the entity that is transmitting the modification request is referred to as the modifying entity.

Figure 7:
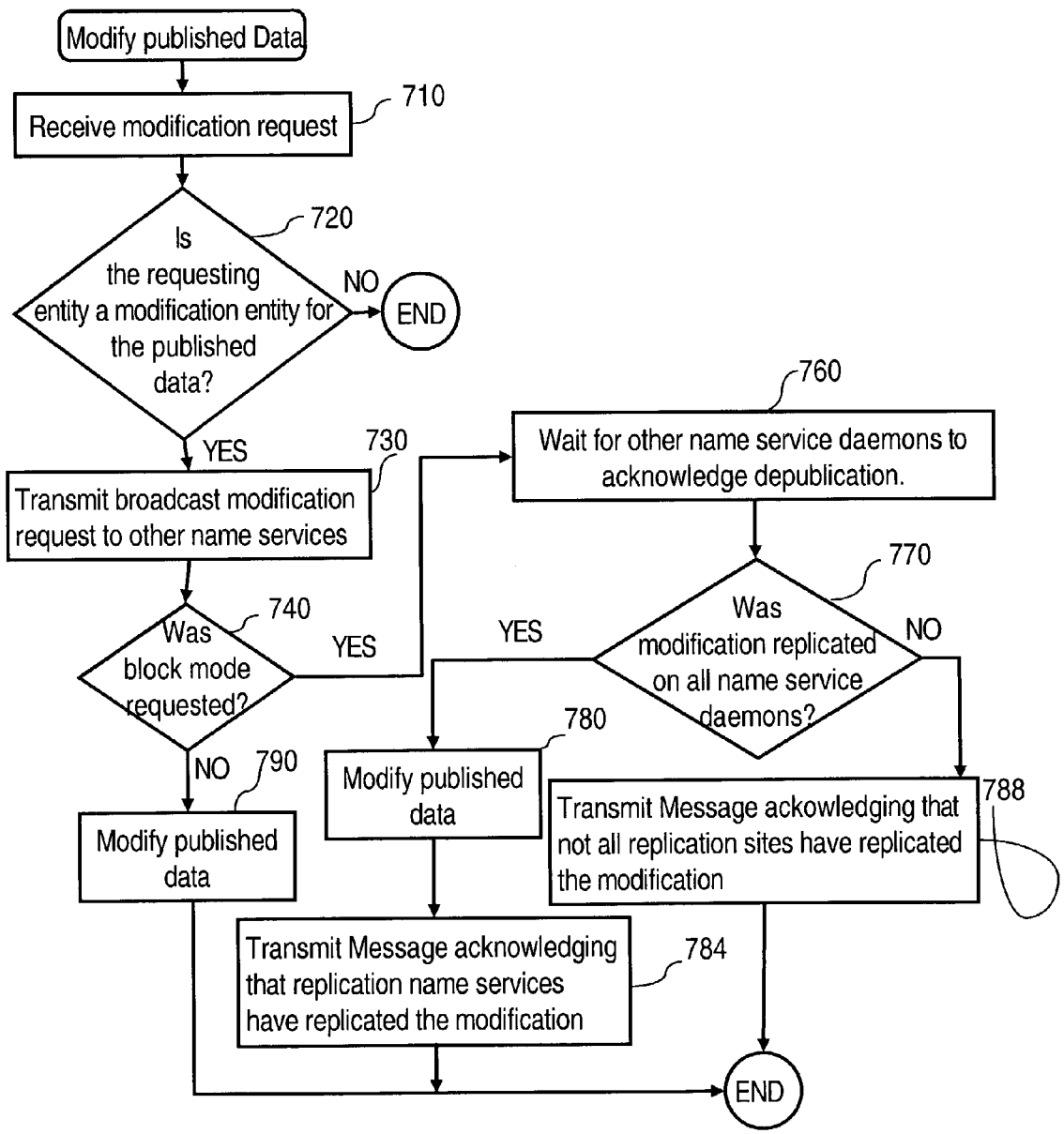
FIG. 7 is flow chart showing steps for modifying data according an embodiment of the present invention.

FIG. 7 shows the steps for modifying published data according to an embodiment of the present invention. At step 710, a modification request is received from process 220. The modification request specifies one or more keys and a replacement value.

At step 720, it is determined whether the requesting entity is a modification entity associated with the modification keys. If it is determined that the requesting entity is not a modification entity associated with the modification key, then execution of the steps ceases. Otherwise, control passes to step 730.

At step 730, a broadcast modification request is transmitted to the replicating name service daemons. A broadcast modification request is a request transmitted from the modifying name service daemon to a replicating name service daemon to cause the replicating name service daemon to modify a replicated name entry. The request specifies the modified values for the fields of a name entry (e.g. keys field 315, published data field 320, a modification entities field 330, and a duration entities field 340). In this example, name service daemon 240 transmits a broadcast modification request to name service daemon 290.

At step 740, it is determined whether the modifying entity requested blocking mode modification. If blocking mode modification was requested, then execution of the steps flows to step 760. Otherwise, execution proceeds to step 790, where published data associated with the modification key is replaced.

At step 760, the modifying name service daemon waits for broadcast modification acknowledgments from the replicating name service daemons. A broadcast modification acknowledgement is a message sent from a replicating name service daemon acknowledging it has replicated the specified modification. The name service daemon may wait until an acknowledgement is received from each of the name service daemons, or until a threshold period of time expires.

When a replicating name service receives the broadcast modification request, it may perform additional tests to ensure the requested modification may be properly made. Such additional checking may include that the name entries under the control of the replication name service reflect that the requesting entity is a modification entity for name entry specified by the broadcast modification request.

At step 770, it is determined whether modification acknowledgements were received from all the replicating name service daemons. If modification acknowledgements were received from all the replicating name service daemons, control flows to step 780. Otherwise, control flows to step 788, where a message is transmitted indicating that the replication name service daemons did not receive modification acknowledgements from all replicating name service daemons.

At step 780, the published data is modified according to the modification request. At step 784, a message is transmitted indicating that the modifying name service daemon received modification acknowledgements from all replicating name service daemons.

Specifying how to Modify Published Data

Rather than merely specifying a replacement value for published data, modification requests may specify how to manipulate published data. For example, a request may specify a key and a pointer to a function. In response to receiving the request, the name service invokes the function to manipulate the published data associated with the key. Use of pointer, for example, enables modification of published data through routines external to the name service, that is, routines that are not integrated into the name service.

Published data may also serve as input to the function. For example, the request may specify one or more other keys. The other keys are associated with published data that serves as input parameters to the function.

Although several techniques for specifying and performing modifications to published data have been illustrated, others are possible. Therefore, it is understood that the present invention is not limited to any particular technique for specifying and modifying published data.

Recovery in Case of a Failed Name Service

It is possible that a name service daemon may experience a system failure. A system failure is a condition under which a name service daemon is unable to operate properly due to the occurrence of an operating error, such as a system crash, power failure, or a memory leak. Name entries originating from a failed publishing name service daemon may continue to reside on the remaining name service daemons because the failed name service daemon can no longer issue depublication requests. To prevent these orphaned name entries from persisting indefinitely, name service recovery is performed.

Replicated name entries managed by a particular name service daemon include two types of name entries: local name entries and non-local name entries. A local name entry is created by the name service daemon that received the publication request for the name entry. A non-local name entry is a name entry replicated by a name service daemon that received a broadcast publication request for the name entry.

To perform name service recovery, the remaining name service daemons delete each non-local entry from the local replicated name entries, and transmit broadcast publication requests for local name entries to the other remaining name service daemons. After name service recovery is performed using this technique, each set of replicated name entries will contain entries that were published by the remaining name service daemons, but will no longer have entries that were originally published by the failed name service daemon.

Under various circumstances, it may be desirable to add a name service daemon to a name service. For example, a failed name service daemon may be recovered and rejoin the name service to which it belonged prior to the failure. When a name service daemon is joining an existing name service, name service daemons broadcast their local entries to the joining name service daemon, and the joining name service daemon broadcasts its local entries (if any) to each name service daemon in the name service.

Persistent Name Entries

When a name service terminates, its name entries are depublished. However, a name service client may wish to publish information, and have that information persist longer than the name service client. For example, it may be desirable to publish information about a database table, and have that information remained published beyond both the duration of the database server 210 or name service 202.

To make published data persistent, a name service client transmits a publication request that includes data specifying that the published data in issue is persistent, that is, exceeds the duration of the name service. When the name service creates a name entry for the published data, the name service marks the data as persistent. When the name service terminates, it stores the marked entries to persistent storage. When the name service starts again, a name service reads the marked entries from persistent storage, and for each transmits broadcast publication requests to the other name service daemons.

While the present invention has been illustrated using published data that is associated with one set of entities that serve as modification entities and another set of entities that serve as duration entities, it is not necessary that the published data be associated with two sets of entities in this manner. In fact, published data may be associated with just a single entity that serves as both a modification entity and a duration entity. Furthermore, a name entry may contain in place of modification entities field 330 and duration entities field 340, a single field that specifies the single entity.

Furthermore, there may be different types of modification entities. For example, one type may only depublish published data, while another type may only update published data. For each type a separate field in a name entry may be used to specify what entities belong to what modification type (e.g. a Depublishers Entities Field to specify what modification entities may depublish, an Update Entities Field to specify which modification entities may update published data). Alternatively, data in modification entities field may indicate the type of modification entity. For example, modification entities field 330 may contain the following string to indicate that transaction 230 may only update published data corresponding to name entry 310, and process 220 may only depublish the published data.

"Transaction230=Update, Process220=Depublish"

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising computer-implemented steps of:
   receiving, by a name service, a certain message from a client, said message including:
   published data,
   key information that identifies one or more keys associated with said published data, and
   modification entity information that:
   is separate from said key information, and
   indicates the identity of one or more modification entities associated with said published data;
   storing, by said name service, in response to receiving said certain message, a particular entry that contains:
   said published data,
   said one or more keys, and
   modification entity data, separate from said one or more keys, that represents said modification entity information;
   receiving, by said name service, from a particular client, a request to modify certain data associated with said one or more keys, said request requiring modification of said particular entry;
   inspecting, by said name service, said modification entity data in response to receiving said request to modify certain data associated with said one or more keys;
   determining, by said name service, whether said particular client is permitted to modify said particular entry based on said inspecting step;
   modifying by said name service, said certain data included in said particular entry in response to determining that said particular client is permitted to modify said particular entry; and
   wherein the steps of the method are performed by one or more computing devices.

2. The method of claim 1, wherein the modification entity information identifies a process running on a computer.

3. The method of claim 1, wherein the modification entity information identifies a transaction being executed as an atomic unit of work.

4. The method of claim 1, wherein the step of modifying said certain data associated with said one or more keys includes deleting said entry.

5. The method of claim 1, further including the steps of:
said name service receiving a message indicating an expiration of a duration of a client; and
in response to said name service receiving a message indicating an expiration, depublishing said published data associated with one or more keys.

6. The method of claim 1, wherein the modification entity information specifies which particular modification entities may depublish but may not modify said published data.

7. The method of claim 1, wherein the modification entity information specifies which particular modification entities may modify but may not depublish said published data.

8. The method of claim 1, wherein the modification entity information implicitly identifies at least one modification entity.

9. The method of claim 1, wherein the modification entity information identifies a database session on a database system.

10. A non-transitory computer-readable storage medium storing one or more sequences of instructions which, when executed by one or more processors, causes the one or more processors to perform steps of:
receiving, by a name service, a certain message from a client, said message including:
published data,
key information that identifies one or more keys associated with said published data, and
modification entity information that:
is separate from said key information, and
indicates the identity of one or more modification entities associated with said published data;
storing, by said name service, in response to receiving said certain message, a particular entry that contains:
said published data,
said one or more keys, and
modification entity data, separate from said one or more keys, that represents said modification entity information;
receiving, by said name service, from a particular client, a request to modify certain data associated with said one or more keys, said request requiring modification of said particular entry;
inspecting, by said name service, said modification entity data in response to receiving said request to modify certain data associated with said one or more keys;
determining, by said name service, whether said particular client is permitted to modify said particular entry based on said inspecting step; and
modifying by said name service, said certain data included in said particular entry in response to determining that said particular client is permitted to modify said particular entry.

11. The non-transitory computer-readable storage medium of claim 10, wherein the modification entity information identifies a process running on a computer.

12. The non-transitory computer-readable storage medium of claim 10, wherein the modification entity information identifies a transaction being executed as an atomic unit of work.

13. The non-transitory computer-readable storage medium of claim 10, wherein the step of modifying said certain data associated with said one or more keys includes deleting said entry.

14. The non-transitory computer-readable storage medium of claim 10, further including the steps of:
receiving, by said name service, a message indicating an expiration of a duration of a client; and
depublishing said published data associated with one or more keys in response to said name service receiving a message indicating an expiration.

15. The non-transitory computer-readable storage medium of claim 10, wherein the modification entity information specifies which particular modification entities may depublish but may not modify said published data.

16. The non-transitory computer-readable storage medium of claim 10, wherein the modification entity information specifies which particular modification entities may modify but may not depublish said published data.

17. The non-transitory computer-readable storage medium of claim 10, wherein the modification entity information implicitly identifies at least one modification entity.

* * * * *

UNITED STATES PATENT AND TRADEMARK OFFICE
CERTIFICATE OF CORRECTION

| | | |
|---|---|---|
| PATENT NO. | : 7,840,671 B2 | Page 1 of 1 |
| APPLICATION NO. | : 10/409541 | |
| DATED | : November 23, 2010 | |
| INVENTOR(S) | : Jeffrey Fischer et al. | |

It is certified that error appears in the above-identified patent and that said Letters Patent is hereby corrected as shown below:

TITLE PAGE, ITEM (56)
On page 2, in column 2, under "Other Publications", line 2, delete "tit" and insert -- in --, therefor.

TITLE PAGE, ITEM (56)
On page 2, in column 2, under "Other Publications", line 2, delete "Nanre" and insert -- Name --, therefor.

On sheet 5 of 7, in Figure 5, Reference Numeral 588, line 1, delete "ackowledging" and insert -- acknowledging --, therefor.

On sheet 5 of 7, in Figure 5, Reference Numeral 584, line 1, delete "ackowledging" and insert -- acknowledging --, therefor.

On sheet 7 of 7, in Figure 7, Reference Numeral 788, line 1, delete "ackowledging" and insert -- acknowledging --, therefor.

Signed and Sealed this
Ninth Day of August, 2011

David J. Kappos
*Director of the United States Patent and Trademark Office*